Patented Apr. 20, 1954

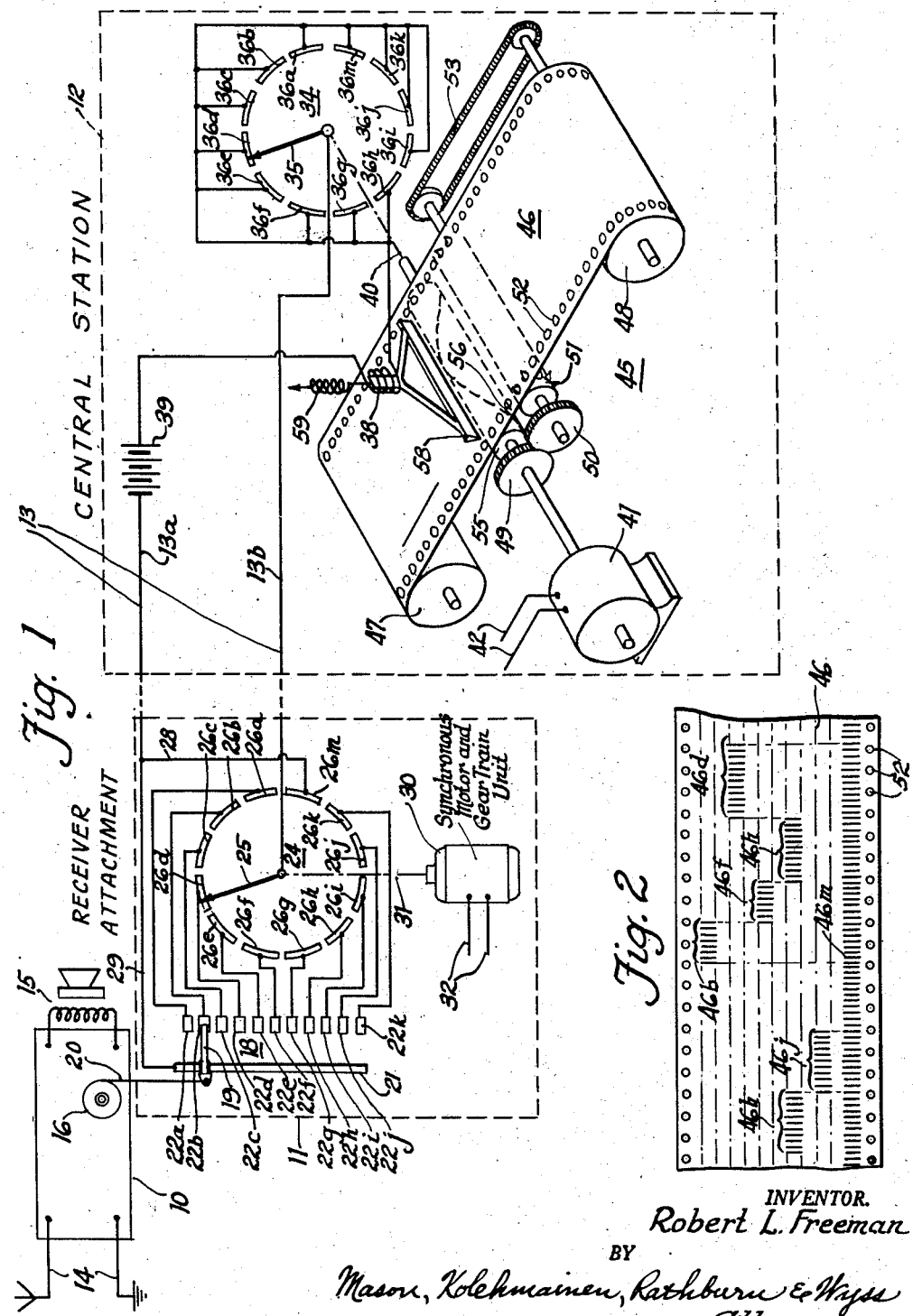

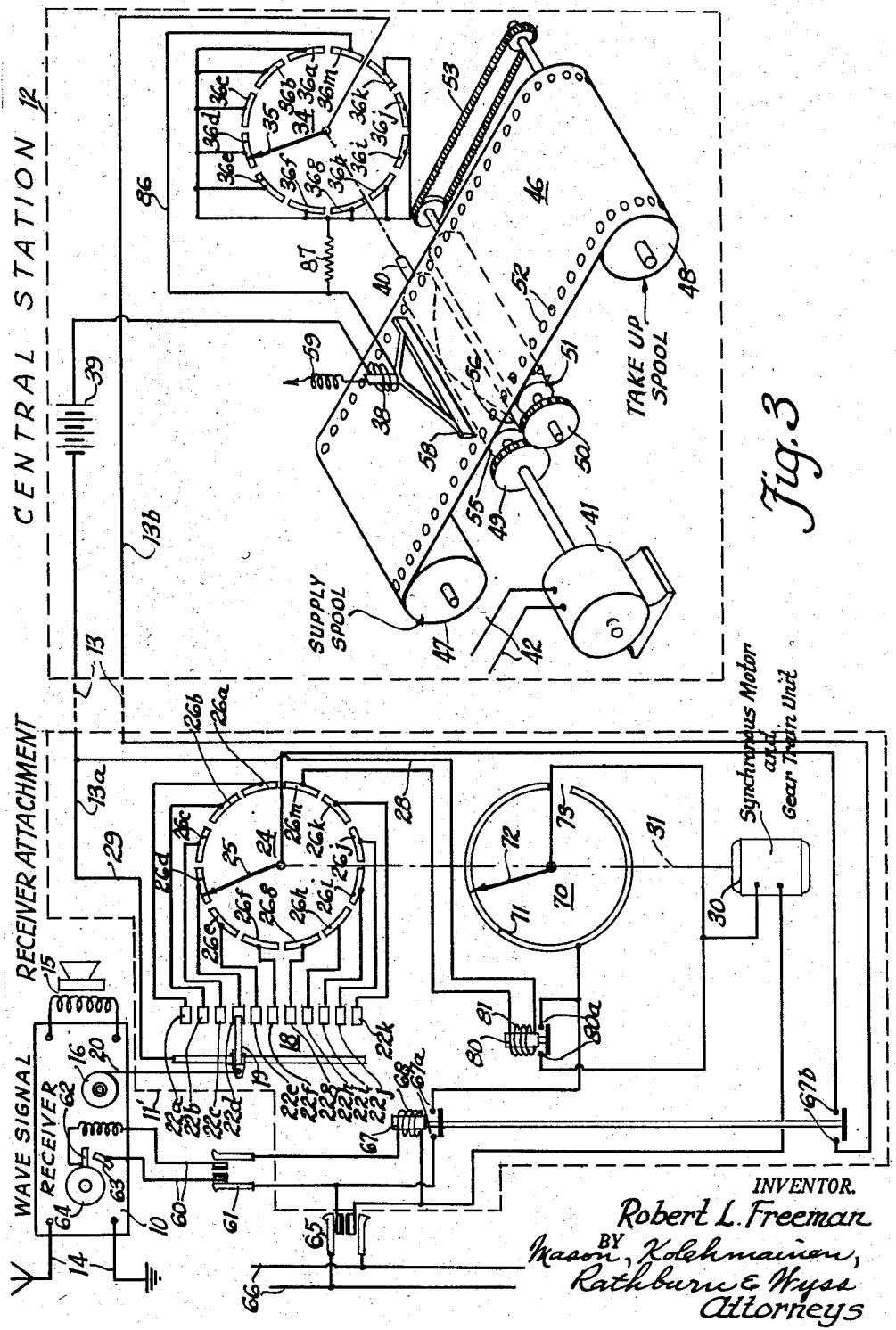

2,676,085

UNITED STATES PATENT OFFICE 2,676,085

APPARATUS FOR INDICATING INSTANTANEOUSLY AND AT A REMOTE POINT THE TUNING CONDITION OF ONE OR MORE WAVE SIGNAL RECEIVERS

Robert L. Freeman, Evanston, Ill., assignor to A. C. Nielsen Company, Chicago, Ill., a corporation of Illinois Application February 2, 1949, Serial No. 74,075

7 Claims. (Cl. 346—37)

The present invention relates to a system and apparatus for indicating at a remote point the instantaneous condition of one or more wave signal receivers. Specifically the present invention is an improvement on copending Bateman et al. application, Serial No. 74,074, filed concurrently herewith and assigned to the same assignee as the present invention.

In recent years it has become apparent that instrumented methods of determining the listening habits of users of wave signal receivers, or viewing habits in the case of television, is the only satisfactory way of obtaining accurate information in this regard. In many cases it is desirable that information with respect to the condition of a plurality of wave signal receivers be instantaneously available at a central station or central point remote from the place where the wave signal receivers are located, so that the analysis organization which prepares an analysis of the listening habits of wave signal receiver users may have this information to prepare reports with a minimum of delay. It will be understood that if it is necessary to record the information at the various homes in which the wave signal receiver use is to be logged, that the gathering of recorded information at the end of each day, for example, is, if not impossible, at least prohibitive from a cost standpoint.

Obviously if the record produced of the tuning conditions of the receivers is allowed to accumulate for a predetermined calendar period of a week, two weeks or longer as is usually the case, a substantial delay in the report which is eventually prepared based on the facts obtained by the instrumented methods is immediately introduced. Consequently it is desirable particularly in areas where a substantial number of homes are logged to have an arrangement whereby the information of the tuning condition of receivers is instantaneously available at a central station. The central station can also, of course, be located in a collaborator's home to log one or more receivers located in that home.

Accordingly it is an object of the present invention to provide a new and improved apparatus for indicating at a remote point which may be a central indicating or recording station the instantaneous tuning condition of receivers located at distant points from the recording stations.

It is a further object of the present invention to provide new and improved receiver tuning indicating apparatus including synchronously driven commutator means located both at the receiver and central station for instantaneously indicating the tuning condition of a wave signal receiver.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a schematic representation of one embodiment of the present invention;

Fig. 2 is a view of a portion of a record tape illustrating a typical recording produced with the arrangement disclosed in Fig. 1; and Fig. 3 is a schematic diagram similar to Fig. 1 illustrating a modification of the present invention.

Briefly the present invention has for its primary purpose the instantaneous indication or recording or both at a central station of the tuning condition of wave signal receivers located in various homes. These homes will constitute a sample representative of all the listeners of particular transmitting stations, or viewers in the case of television. It will be understood that the actual sample will comprise several hundred or even hundreds of wave signal receivers located in homes within the radiation areas of different wave signal transmitters broadcasting the particular programs of interest. By obtaining accurate information with respect to the tuning conditions of all the receivers employed in the homes constituting the sample, it is possible to make a statistical analysis of the listening habits from which the various factors affecting the sales effectiveness of particular radio programs or advertising schemes may be arrived at. It will be understood that the collaborator homes, that is the homes in which wave signal receiver use is to be logged shall be chosen on a basis such that all of the variable factors, as for example, the number of potential listeners, economic affluence, religion, etc. which normally affect any process of sampling public opinion are accounted for on a weighted basis. The present invention is concerned with an arrangement whereby at a central station or a central recording point a record or indications may be produced of the tuning condition of a plurality of wave signal receivers included in a sample. Since the central station may be under the direct control of the analysis organization the information with respect to the tuning conditions of the receivers is continuously and instantaneously available to the analysis organization whereby it is possible to analyze the data received and preferably recorded and produce the necessary results in a minimum of time.

Referring now to Fig. 1 of the drawings, it will be apparent that the apparatus or system of the present invention essentially comprises two basic units used in association with one or more wave signal receivers such as 10. These units comprise a receiver attachment 11 and a central station 12. Although only a single wave signal receiver 10 has been illustrated, it should be understood that a plurality of wave signal receivers located in the same or different homes would normally be employed and with each of these wave signal receivers there would be provided a receiver attachment similar to the receiver attachment 11. However, for one or more wave signal receivers 10 and associated receiver attachments 11 there would be only a single central station 12, which, as is illustrated in the drawings, is connected to the receiver attachments by a suitable link such as a space link, power lines, or as illustrated by a pair of telephone lines 13 which may be leased telephone lines or the like. These telephone lines are indicated with a dotted line portion to designate the remote relationship between the central station 12 and the receiver attachment 11.

Preferably the receiver attachment 11 is closely associated with the receiver 10, and furthermore is usually of sufficiently small bulk so as to be readily disposed within the available space in the cabinet of the wave signal receiver 10.

The wave signal receiver 10 may comprise any wave signal receiver employed for listening or viewing purposes and is schematically illustrated as comprising an antenna ground circuit 14 and a signal reproducer 15 which in the case of a radio receiver comprises a loud speaker or the like and in the case of a television receiver comprises a fluorescent screen of some sort. It will be understood that such a receiver 10 will comprise suitable control means not shown including a manually operative tuning device which may include a tuning button 16 schematically shown in Fig. 1 of the drawings.

For the purpose of channelizing the tuning positions of the wave signal receiver 10 there is included in the receiver attachment 11 a channel switch generally designated at 18 comprising a multiple contact switching member 19 connected in any suitable manner so as to assume different predetermined positions in dependence upon the particular tuning condition of the wave signal receiver 10. As illustrated the switching member 19 is connected by suitable means schematically indicated at 20 with the tuning button 16. The movable switching member 19 is adapted to slidingly engage with an elongated stationary contact 21 and a plurality of spaced contacts 22 specifically designated as 22a to 22k, inclusive. It will be apparent that the switching member 19 for a particular tuning condition of the wave signal receiver 10 will engage the elongated contact 21 and a predetermined one of the contacts 22a to 22k inclusive. It should be understood that the channelizing switch 18 may comprise any suitable position switch capable of accurately translating the tuning positions of the wave signal receiver 10 to tuning channels representative of the engagement of the switching member 19 with a predetermined selected one of the contacts 22a to 22k inclusive. Such a position switch 18 may be similar to that disclosed and claimed in copending applications Serial No. 7,647 and 7,648 Rahmel and Bentley, and Rahmel respectively, both filed February 11, 1948, and assigned to the same assignee as the present invention. Preferably a rotary multiple contact switch of the type disclosed and claimed in copending Krahulec application, Serial No. 78,921 filed March 1, 1949, and assigned to the same assignee as the present invention is employed.

In accordance with the present invention the receiver attachment 11 further includes a synchronous commutator switch 24, preferably also of the type disclosed in the above mentioned Krahulec application, comprising a rotatable switching arm 25 and a plurality of contact segments 26 specifically designated as 26a, 26b, 26c, 26d, 26e, 26f, 26g, 26h, 26i, 26j, 26k and 26m respectively, which are arranged in spaced relationship along the circumference of a circle so as to be selectively electrically engaged in the order stated by the switching arm 25 upon synchronous rotation thereof. The contacts 22a to 22k of the channelizing switch 18 are each connected to one of the segments 26 of the synchronous commutator switch 24. As illustrated the contacts 22 are connected to the contacts 26 so that those contacts with the same subscript are interconnected. For example, the contact 22a is connected directly with the contact 26a. Similarly the contact 22b is connected directly with the contact 26b, etc. Thus all of the contacts 26 of the synchronous commutator switch 24 except contact 26m are connected to a corresponding contact 22 of the channelizing switch 18. The contact 26m is connected directly to one of the telephone lines 13, specifically designated as 13a, to which same telephone line is also connected the elongated contact 21. Specifically the contact 26m is connected by a conductor 28 to the line 13a while the elongated contact 21 is connected to line 13a by the conductor 29. The other telephone line 13b is connected directly to the rotating synchronous switch arm 25.

To complete the apparatus at the receiver attachment there is provided a synchronous motor generally designated at 30 which is drivingly connected with the rotary switch arm 25 by means of a shaft 31. Preferably the synchronous motor 30 causes the rotary switch arm 25 to rotate at a constant speed of one revolution per minute. As illustrated the motor 30 is connected to a source of power 32 so as to be continuously operative. It should be understood, however, that the synchronous motor 30 may be energized only when the receiver 10 is turned on. Such an arrangement is disclosed in Fig. 3 of the drawings and will be described in detail hereinafter.

For the purpose of producing at a remote point a continuous indication of the tuning condition of the wave signal receiver 10 the telephone lines 13 which extend to the central station 12 are connected to a synchronously driven commutator switch 34 which is substantially identical with the synchronous commutator switch 24, including a rotatable switch arm 35 and a plurality of contacts 36 specifically designated as 36a, 36b, 36c, 36d, 36e, 36f, 36g, 36h, 36i, 36j, 36k and 36m. As illustrated the contacts 36 are arranged along the circumference of a circle in a spaced manner with the contacts marked with the corresponding subscript disposed in the same position as the contacts 26 marked with the same subscript. All of the contacts 36a to 36k inclusive and 36m are connected in parallel with one another and to the telephone line 13a through a winding 38, to be described in greater detail hereinafter, and a direct current source of potential such as a battery 39. The other telephone line 13b is connected directly to the rotary switch arm 35.

It will be apparent that current will flow through the telephone lines 13a and 13b each time the synchronous switches 25 and 35 are on corresponding contacts which have the same subscript as the contact 22 engaged by the switching member 19. Also whenever the rotary switch arms 25 and 35 simultaneously engage their associated contact marked with a subscript "m" current will flow through the telephone lines 13. As illustrated the rotating switch arm 35 is drivingly connected by means of a shaft 40 with a synchronous motor 41 suitably energized from a source 42 provided at the central station 12.

The synchronous motors 30 and 41 are preferably maintained constantly energized so as to remain in synchronism with the rotary switch arms 25 and 35 rotating at the same constant speed and engaging simultaneously contacts marked with the same subscript. For the particular position of the contacts disclosed in Fig. 1 of the drawings it will be apparent that each time that synchronous switch arms 25 and 35 simultaneously engage their associated contacts 26b and 35b respectively a circuit is completed through the telephone lines and the contact 22b so that the winding 38 is energized. Similarly whenever the rotary switch arms 25 and 35 engage their contacts 26m and 36m simultaneously a current will flow through the winding 38 regardless of the position of the switching member 19 since the circuit through contact 26m does not include the channelizing switch 18.

From the above description it will be understood that the flow of current through the winding 38 will indicate periodically such as once per minute the tuning condition of the receiver 10 at a point remotely located with respect to the receiver 10. Any suitable indication of the flow of current through the winding 38 may be accomplished. As illustrated the winding 38 forms a part of a recording device generally indicated at 45 also disposed at the central station 12, which recording device is illustrated as of the type disclosed in copending Krahulec et al. application, Serial No. 147,304 filed March 2, 1950, and assigned to the same assignee as the present application.

The recording device 45 comprises a movable recording element 46 in the form of a record tape which is adapted to move between a supply spool 47 and a take up spool 48. Preferably the recording element 46 moves at a constant speed which may be accomplished by driving the same from the synchronous motor 41. To this end the shaft 40 associated with the synchronous motor 41 is provided with a gear 49 drivingly engaging a gear 50 which in turn drives a sprocket 51, having sprocket teeth engageable with perforations 52 defined along the outer edges of the recording element 46. As illustrated the take up spool 48 is driven from the sprocket 51 by means of a spring belt 53 which preferably overdrives the take up spool 48 to maintain the tape or recording element in a taut condition.

To produce a record on the recording element 46 indicative of the flow of current through the winding 38 and furthermore indicative of the particular position of the synchronously driven switch arm 35 when such current flow occurs, which in turn is indicative of the particular position of the switching member 19 in the receiver attachment 11, the recorder 45 includes a rotatable element 55 in the form of a cylinder having formed on the outside thereof a raised helix 56 which makes one complete revolution around the cylindrical member 55 and which is confined within the transverse limits of the recording element 46. The cylinder 55 supporting the helix 56 is preferably mounted on the shaft 40 so as also to rotate at one revolution per minute with the synchronous switch arm 35. The helix 56 is disposed just beneath the recording element 46, so that the recording element 46 may be moved into engagement with the helix 56. At any instant a particular portion of the helix can be made to engage effectively the recording element 46 so as to produce a trace thereon, the transverse position thereof on the record tape being indicative of the angular location of the synchronous switch arm 35 at that instant.

For the purpose of producing a record on the recording element 46 there is provided a solenoid actuated printer bar 58 associated with the winding 38. Normally the printer bar 58 is biased away from the recording element 46 by means of a spring 59. However, whenever the winding 38 is energized the printer bar 58 moves into engagement with the recording element 46 and in turn presses the recording element 46 against the helix 56 to produce a trace thereon.

The operation of the arrangement disclosed in Fig. 1 of the drawings will best be understood by reference to a typical record shown in Fig. 2 of the drawings. The synchronous motors 30 and 41 at the receiver attachment 11 in the central station 12 are constantly energized so as to rotate the switch arms 25 and 35 in synchronism with each other. The tuning condition of the wave signal receiver 10 is indicated by the position of the switch arm 19 of the channelizing switch 18. With the arrangement illustrated a record will be produced on the recording element 46 indicative of the position of the switching member 19. A trace designated as 46m in Fig. 2 will be produced whenever the synchronous switch arms 25 and 35 engage their respective stationary contacts 26m and 36m, and traces such as 46b, 46d, 46f, 46h and 46j will be produced transversely of the tape 46 depending upon the tuning condition of the receiver 10.

With the arrangement illustrated no provision is made for indicating the on or off condition of the receiver 10. Preferably however, the conductor 29 includes a switching member which opens the circuit whenever the receiver 10 is turned off and closes the circuit whenever the receiver 10 is turned on. The record shown in Fig. 2 assumes that such a switch is included in the conductor 29 whereby when the receiver 10 is turned off only the trace 46m is produced.

Although the synchronous motors 30 and 41 require very small amounts of power to energize the same, it is generally undesirable to have the synchronous motor 30 operative at the receiver attachment 11 when the receiver 10 is turned off. Furthermore power outages at either the receiver attachment or the central station which do not affect both ends of the system might cause the synchronous motors 30 and 41 to get out of step. Consequently, it would be desirable to provide an arrangement in which the synchronous motor at the receiver attachment 11 is energized only when the receiver is turned on or retuned, whereby means for synchronizing the motors at each end of the system are required each time a tuning change occurs. Such an arrangement is disclosed in Fig. 3 of the drawings and is described in detail hereinafter.

Referring now to Fig. 3 of the drawings where the corresponding parts are designated by the same reference numerals, there is again disclosed a wave signal receiver 10 illustrated as substantially identical with the receiver shown in Fig. 1. In this case the receiver 10 is connected by means of a power cord 60 to the receiver attachment 11′ by means of a plug connector 61. The power cord 60 is connected through a conventional on-off switch comprising the contacts 62 and 63 will are preferably operable by the manual volume control and "on"-"off" switch controlled by the manual control button 64. The receiver attachment 11′ is connected through a plug connector 65 with a source of alternating potential 66. A series relay generally designated at 67 comprises a winding 68 connected in series with the switch comprising contacts 62 and 63. Whenever the wave signal receiver 10 is turned on which involves closing of the switch comprising the contacts 62 and 63, current flows through the winding 68 of the series relay 67 so as to close two sets of normally open contacts designated at 67a and 67b respectively. As illustrated the contacts 67a supply power from source 66 to the synchronous motor and gear train unit 30 which is drivingly connected by means of a shaft 31 with the synchronous commutator switch 24. Interposed within the energization circuit of the synchronous motor 30 is a synchronizing switch generally designated at 70 comprising a somewhat circular contact 71 and a rotary synchronous switch arm 72. The synchronous switch arm 72 is fastened to the shaft 31 so as to be constantly in the same phase position as the synchronous switch arm 25 also fastened to the shaft 31. As illustrated the circular contact 71 is discontinuous and includes an open or discontinuous portion indicated at 73, which discontinuous portion is in the identical phase position of the contact 26m of the synchronous commutator switch 24. Preferably the contact 26m is of slightly greater extent than the opening 73. It will be apparent that as long as the synchronous switch arm 72 is in contact with the substantially circular contact 71 and the contacts 67a are closed power will be supplied to the synchronous motor 30. When, however, the rotary switch arm 72 reaches the open portion 73 of the circular contact 71 the energization circuit for the synchronous motor 30 is interrupted.

The receiver attachment 11′ includes the synchronous commutator switch 24 and the channelizing switch 18 identical with the corresponding elements disclosed in Fig. 1 of the drawings. In addition the receiver attachment includes a relay 80 including a winding 81 which is connected in series with the conductor 28 interconnecting telephone wire 13a and the segment 26m. This relay comprises a pair of normally open contacts 80a which are connected in the energization circuit of the synchronous motor 30 in parallel with the synchronizing switch 70.

As illustrated the telephone lines 13 comprise the line 13a directly connected through the conductor 29 to the elongated contact 21a as in Fig. 1 of the drawings, and the telephone wire 13b which is connected to the synchronous switch arm 25 as in Fig. 1 of the drawings through the contacts 67b of the series relay 67.

In accordance with the present invention the relay 80 is designed so as to require a predetermined magnitude flow of current therethrough, to cause energization thereof. For the purpose of providing an arrangement whereby the relay 80 is energized only during the time when the rotating switch arm 25 is in contact with the segment 26m and simultaneously the rotating switch arm 35 is in contact with its segment 36m, there is provided a current limiting resistor 87 connected in series with all of the parallel disposed contacts 36 of the synchronous switch 34 except the contact 36m. The resistor 87 limits the current which can flow through the telephone lines 13a and 13b whenever a circuit is completed through one of the contacts 36 except the contact 36m. The contact 36m on the other hand is directly connected by means of a conductor 86 to one terminal of the winding 38 in parallel with the current-limiting resistor 87.

In view of the detailed description included above the operation of the arrangement disclosed in Fig. 3 of the drawings will be understood by those skilled in the art. Briefly, however, when the receiver 10 is turned on the series relay 67 is energized to close its contacts 67a and 67b. It will be understood that at all times the synchronous switch 34 at the central station 12 is continuously and synchronously driven at say one revolution per minute by the motor 41 which also drives the recording element 46 at constant speed. Closing of the contacts 67a causes the synchronous motor 30 to be energized through the synchronizing switch 70 if the motor 30 has stopped at any position other than when the synchronous switch arm 72 is disposed in the open portion 73 of the discontinuous circular contact 71 and the synchronous motor 30 will rotate the synchronous switch arm 35 until the switch arm 35 reaches the discontinuous portion 73 whereupon the motor 30 will be deenergized, with the synchronous switch arm 25 in engagement with the contact 26m. The next time the synchronous motor 41 has rotated the synchronous switch arm 35 into engagement with the contact 36m a current of sufficient magnitude, not limited by current limiting resistor 87, will flow through the telephone lines 13 to cause relay 80 to be energized and close its contacts 80a, thereby starting the synchronous motor 30 which is now in synchronism with the motor 41. The two synchronous motors will continue to rotate in synchronism with the synchronizing switch 70 maintaining the motor 30 energized through a major portion of the rotation of the switch arm 72 and the relay 80 maintaining the synchronous motor 30 energized for the interval when the synchronizing switch 70 is ineffective for this purpose, and the switch arm 25 is in electrical engagement with its contact 26m. It will furthermore be apparent that the winding 38 controlling the printer bar 58 will be energized to cause a record indication on the recording element 46 once each minute when the synchronous switch arms 25 and 35 are in engagement with their corresponding contacts 26m and 36m. Another record indication will be made once each cycle on the recording element 46 depending upon the position of the movable switch arm 19 of the position switch 18. With this arrangement it will be apparent that the synchronous motor 30 need not be energized except when the receiver 10 is turned on, and automatic synchronizing means are provided to not only synchronize the motors 30 and 41, but to maintain the same in synchronism once such synchronism is obtained.

In the arrangement specifically described above the synchronizing means for synchronizing the synchronous motors 30 and 41 each time the receiver 10 is turned on, or in fact whenever the two motors are out of synchronism and the receiver 10 is turned on, depends upon a variation in the magnitude of current flowing through the telephone wires 13 in dependence upon whether or not the current limiting resistor 87 is effective or ineffective to control the current. If, for example, a space link is employed instead of the telephone wires 13, it will be understood by those skilled in the art that a variation in frequency or some other characteristic of the signal might better be employed than a variation in the magnitude of the signal.

Although for purposes of simplifying the drawing and description the arrangement has been disclosed with reference to a single receiver, it will be understood that a single central station could be associated with a plurality of receivers and receiver attachments. One simple way of doing this would merely involve sharing the contacts of the synchronous switches 24 and 34 among the plurality of receivers being monitored. For additional stations each switch could be provided with additional contacts. Another way of doing this would require the provision of means for producing a unique signal such as that produced by the contacts 26m and 36m indicating the particular receiver turned on. If desired the motor 41 at the central station may be drivingly connected to a plurality of synchronous switches, one for each receiver being monitored and each synchronous switch will have a contact capable of controlling the production of a unique indication identifying the particular receiver turned on.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. Apparatus for indicating at a remote point the tuning condition of a wave signal receiver capable of being selectively tuned to any one of a plurality of transmitting stations, comprising a receiver attachment associated with said receiver, a central station remotely located with respect to said receiver attachment, a position switch in said receiver attachment having a plurality of contacts one for each transmitting station likely to be tuned in by said receiver, means directly responsive to the tuning condition of said receiver for selectively rendering one of said plurality of contacts effective, a first multiple contact rotary switch having contacts spaced about the entire circumference of a circle the number of contacts exceeding by one the number of contacts on said position switch located at said receiver attachment, a first synchronous motor drivingly connected to said first switch, means electrically interconnecting each contact of said position switch with a corresponding contact of said first rotary switch, a second multiple contact rotary switch at said central station, a second synchronous motor capable of operating in phase with said first synchronous motor drivingly connected to said second switch, a signal link interconnecting said receiver attachment and said central station, means responsive to the transmission of a signal over said signal link for producing an indication at said central station of the tuning condition of said receiver, and a circuit electrically interconnecting the additional contact on said first rotary switch and the last mentioned responsive means so as to provide an indication at said central station of the continuous operation of the first synchronous motor and the first rotary switch at the remote point.

2. Apparatus for indicating at a remote point the tuning condition of a wave signal receiver capable of being selectively tuned to any one of a plurality of transmitting stations, comprising a receiver attachment associated with said receiver, a central station remotely located with respect to said receiver attachment, a position switch in said receiver attachment having a plurality of contacts one for each transmitting station likely to be tuned in by said receiver, means responsive to the tuning condition of said receiver for selectively rendering any one of said plurality of contacts effective, a first multiple contact rotary switch having at least as many contacts as said position switch located at said receiver attachment, a first synchronous motor drivingly connected to said first switch, means electrically interconnecting each contact of said position switch with a corresponding contact of said first rotary switch, means for deenergizing said first motor in response to turning off said receiver, a second multiple contact rotary switch at said central station, a second synchronous motor capable of operating in phase with said first synchronous motor drivingly connected to said second switch, a signal link interconnecting said receiver attachment and said central station, means at said receiver attachment and including said signal link for altering the phase of the first synchronous motor following turning on of said receiver to thereby assure synchronous operation of the first and second motors, and means responsive to the transmission of a signal over said signal link for producing an indication at said central station of the tuning condition of said receiver.

3. Apparatus for indicating at a remote point the tuning condition of a wave signal receiver capable of being selectively tuned to any one of a plurality of transmitting stations, comprising a receiver attachment associated with said receiver, a central station remotely located with respect to said receiver attachment, a position switch in said receiver attachment having a plurality of contacts one for each transmitting station likely to be tuned in by said receiver, means responsive to the tuning condition of said receiver for selectively rendering any one of said plurality of contacts effective, a first multiple contact rotary switch located at said receiver attachment and having at least as many contacts as said position switch, a first synchronous motor drivingly connected to said first switch, means electrically interconnecting each contact of said position switch with a corresponding contact of said first rotary switch, a second multiple contact rotary switch at said central station, means for electrically interconnecting the movable elements of said first and second rotary switches, a second synchronous motor capable of operating in phase with said first synchronous motor drivingly connected to said second switch, a signal link interconnecting said receiver attachment and said central station, means at said receiver attachment for altering the phase of said first motor when said receiver is turned on to thereby synchronize the first and second motors, and means responsive to the transmission of a signal over said signal link for producing an indication at said central station of the tuning condition of said receiver.

4. Apparatus for indicating at a remote point the tuning condition of a wave signal receiver capable of being selectively tuned to any one of a plurality of transmitting stations, comprising a receiver attachment associated with said receiver, a central station remotely located with respect to said receiver attachment, a position switch in said receiver attachment having a plurality of contacts one for each transmitting station likely to be tuned in by said receiver, means directly responsive to the tuning condition of said receiver for selectively rendering one of said plurality of contacts effective, a first multiple contact rotary switch located at said receiver attachment having at least as many contacts as said position switch, a first synchronous motor drivingly connected to said first switch, means electrically interconnecting each contact of said position switch with a corresponding contact of said first rotary switch, a second multiple contact rotary switch at said central station, a second synchronous motor capable of operating in phase with said first synchronous motor drivingly connected to said second switch, an electrical circuit electrically interconnecting said rotary switches so that the rotary switch arms of said rotary switches are directly connected whereby a current may flow therethrough only when said receiver is turned on and said position switch and rotary switches are simultaneously in predetermined positions, and means responsive to the transmission of a current over said circuit for producing an indication at said central station of the tuning condition of said receiver.

5. Apparatus for indicating at a remote point the tuning condition of a wave signal receiver capable of being selectively tuned to any one of a plurality of transmitting stations, comprising a receiver attachment associated with said receiver, a central station remotely located with respect to said receiver attachment, a position switch in said receiver attachment having a plurality of contacts one for each transmitting station likely to be tuned in by said receiver, means responsive to the tuning condition of said receiver for selectively rendering any one of said plurality of contacts effective, a first multiple contact rotary switch located at said receiver attachment having a number of contacts which exceed by one the number of contacts on said position switch, a first synchronous motor drivingly connected to said first switch, means electrically interconnecting each contact of said position switch with a corresponding contact of said first rotary switch, a second multiple contact rotary switch at said central station, a second synchronous motor capable of operating in phase with said first synchronous motor drivingly connected to said second switch, an electrical circuit electrically interconnecting said rotary switches so that a current may flow therethrough when said receiver is turned on and said position switch and rotary switches are simultaneously in predetermined positions, means responsive to the transmission of a current over said circuit for producing an indication at said central station of the tuning condition of said receiver, a circuit electrically interconnecting the additional contact on said first rotary switch and said indication producing means so as to provide an indication at said central station of the continuous operation of the motor and rotary switch at said remote point, and means in said receiver attachment responsive to out of phase operation of said rotary switches for synchronizing said motors by altering the phase of one of said motors.

6. Apparatus for indicating at a remote point the tuning condition of a wave signal receiver capable of being selectively tuned to any one of a plurality of transmitting stations, comprising a receiver attachment associated with said receiver, a central station remotely located with respect to said receiver attachment, record producing means disposed at said central station, a position switch at said receiver attachment having a plurality of contacts, one for each transmitting station likely to be tuned in by said receiver, means responsive to the tuning condition of said receiver for selectively rendering any one of said plurality of contacts effective, a first multiple contact rotary switch at said receiver attachment having one contact for each of the contacts of said position switch and an additional contact, a first synchronous motor drivingly connected to said first switch, means electrically interconnecting each contact of said position switch except said additional contact with a corresponding contact of said first rotary switch, a second multiple contact rotary switch at said central station identical from the standpoint of the number of contacts with said first rotary switch, a second synchronous motor capable of operating in phase with said first synchronous motor drivingly connected to said second switch, a signal link serially interconnecting said rotary switches and position switch, means including said additional contact on said rotary switches for synchronizing said motors by altering the phase of the first motor, means responsive to the flow of current over said signal link for causing said record producing means to record at said central station the tuning condition of said receiver, and means electrically interconnecting the additional contact on the first rotary switch and the record producing means to provide at the central station an indication of the operativeness of the motor and switch at said remote point.

7. Apparatus for indicating at a remote point the tuning condition of a wave signal receiver capable of being selectively tuned to any one of a plurality of received signals, comprising a receiver attachment associated with said receiver, a central station remotely located with respect to said receiver attachment, record producing means disposed at said central station, a position switch at said receiver attachment having a plurality of contacts, one for each transmitting station likely to be tuned in by said receiver, means responsive to the tuning condition of said receiver for selectively rendering any one of said plurality of contacts effective, a first multiple contact rotary switch at said receiver attachment having one contact for each of the contacts of said position switch and an additional contact, a first synchronous motor drivingly connected to said first switch, means electrically interconnecting each contact of said position switch except said additional contact with a corresponding contact of said first rotary switch, a second multiple contact rotary switch at said central station having an equal number of contacts as said first rotary switch, a second synchronous motor capable of operating in phase with the first synchronous motor drivingly connected to said second switch, a signal link serially interconnecting said rotary switches and position switch, means including said additional contact on said rotary switches for synchronizing said motors by altering the phase of the first motor, interlocking means for preventing the operation of the first synchronous motor unless said receiver is turned on, means responsive to the flow of current over the signal link for causing said record producing means to record at said central station the tuning condition of said receiver, and means electrically interconnecting the additional contact on said first rotary switch and the record producing means to provide at the central station an indication of the operativeness of the motor and rotary switch at the remote point.

References Cited in the file of this patent

UNITED STATES PATENTS

| Number | Name | Date |
| --- | --- | --- |
| 1,587,122 | Harlow | June 1, 1926 |
| 1,632,106 | Zogbaum | June 14, 1927 |
| 1,933,650 | Bascom | Nov. 7, 1933 |
| 1,965,393 | Schleicher et al. | July 3, 1934 |
| 2,073,050 | Dicke | Mar. 9, 1937 |
| 2,139,103 | Vanderhider | Dec. 6, 1938 |
| 2,249,324 | Potter | July 15, 1941 |
| 2,342,167 | Potter | Feb. 22, 1944 |
| 2,381,920 | Miller | Aug. 14, 1945 |
| 2,397,604 | Hartley et al. | Apr. 2, 1946 |